United States Patent [19]

Morganti et al.

[11] Patent Number: 5,023,129

[45] Date of Patent: Jun. 11, 1991

[54] ELEMENT AS A RECEPTOR FOR NONIMPACT PRINTING

[75] Inventors: Steven J. Morganti, Brockport; James H. Thirtle, Rochester, both of N.Y.

[73] Assignee: E. I. Du Pont de Nemours and Company, Wilmington, Del.

[21] Appl. No.: 438,830

[22] Filed: Nov. 17, 1989

Related U.S. Application Data

[63] Continuation-in-part of Ser. No. 376,110, Jul. 6, 1989, abandoned.

[51] Int. Cl.$^5$ .............................................. B32B 9/00

[52] U.S. Cl. ................................ 428/195; 428/411.1; 428/483; 430/270; 430/527; 430/529; 430/535; 430/536

[58] Field of Search ............... 430/270, 527, 529, 535, 430/536; 428/195, 411.1, 483

[56] References Cited

U.S. PATENT DOCUMENTS

| | | | |
|---|---|---|---|
| 4,225,665 | 9/1980 | Schadt, III | 430/529 |
| 4,859,570 | 8/1989 | Miller | 430/271 |

*Primary Examiner*—Patrick J. Ryan

[57] ABSTRACT

An element useful for recording images using nonimpact type printing is described. This element is preferably comprised of a transparent support having an antistatic layer coated on one side and a print receptive layer coated on the other. In another embodiment another print receptive layer can be present over the antistatic layer. The print receptive layer is a novel combination of binder, crosslinking agent, whitener, and matte agent. Excellent, hard, sharp images are produced using conventional nonimpact printing devices such as ink jet, pen plotters and electrostatic imaging.

18 Claims, 1 Drawing Sheet

ELEMENT AS A RECEPTOR FOR NONIMPACT PRINTING

CROSS REFERENCE TO RELATED APPLICATIONS

This application is a continuation-in-part of application Ser. No. 07/376,110, filed July 6, 1989.

DESCRIPTION

1. Field of the Invention

This invention relates to an improved element or support that can be used as a receptor for nonimpact type printing. This invention also relates to an element that will produce excellent quality nonimpact type printing and will not jam machines used to impart this printing thereon.

2. Description of the Prior Art

Nonimpact type printing, as is well-known in the prior art, comprises such operations as electrostatics, ink jet and pen plotter printers and the like. Nonimpact printing implies that the printing image be impacted on the receptor without a great deal of force as is common in most, conventional printing. Thus, when the image is applied by ink jet or pen plotters, those instruments barely touch the surface of the receptor. In the case of electrostatic copies, an electrostatic image is usually placed on the receptor and toner adhered thereto. Most of the instruments which use ink jet or pen plotting operations are commonly used with computer operations and thus the nonimpact printing is expected to be rapid and clean. Electrostatic operations are used to make copies of drawings and blue-prints, for example, and these must also pass quickly through those machines. Other nonimpact type printing includes magnetography, ionography, thermal transfer, electrograph and electrophotography among others, for example. Some of the supports used to carry layer or layers which can receive this type of printing are paper, polymers and plastics such as polyethylene terephthalate and polystyrenes, for example. Layers are conventionally applied to these supports and it is this layer which receives the nonimpact printing.

The problem with most of the prior art elements used within this art is that they either tend to produce a poor quality image or jam in the devices used to place the image thereon. It is vital that there be little tendency to stick within the appropriate device since the application of the image is done in such a rapid manner. As previously stated, a number of prior art supports for this receptor are made from paper. Paper does not wear well and will often jam the devices used to impart this printing. Polyester and other plastics are more durable but tend to accumulate a great deal of static charge on the surface thereof. This also causes jamming in these devices and this is intolerable.

Thus, it is an object of this invention to produce an element useful as a receptor in nonimpact printing which will produce high quality images without causing problems within the devices used therewith.

SUMMARY OF THE INVENTION

These and other objects are achieved by providing a film element suitable for nonimpact printing comprising a polymeric shaped article having two sides, an antistatic coating on one side thereof, and at least the other side of said article bearing a print receptive layer consisting essentially of a binder, a whitening agent, a matte agent present in an amount of at least 0.4 $g/m^2$ and a crosslinking agent for said binder, wherein said whitening agent is added in an amount sufficient to produce in the film element a transmission density to white light of at least 0.2.

In another embodiment, the antistatic layer of the element of this invention comprises an antistatic agent having carboxyl groups thereon, a crosslinking agent for the antistatic agent, butylmethacrylate modified polymethacrylate beads and submicron polyethylene beads.

BRIEF DESCRIPTION OF THE DRAWING

In the accompanying drawing, forming a material part of this disclosure.

DETAILED DESCRIPTION OF THE INVENTION

Figure 1:
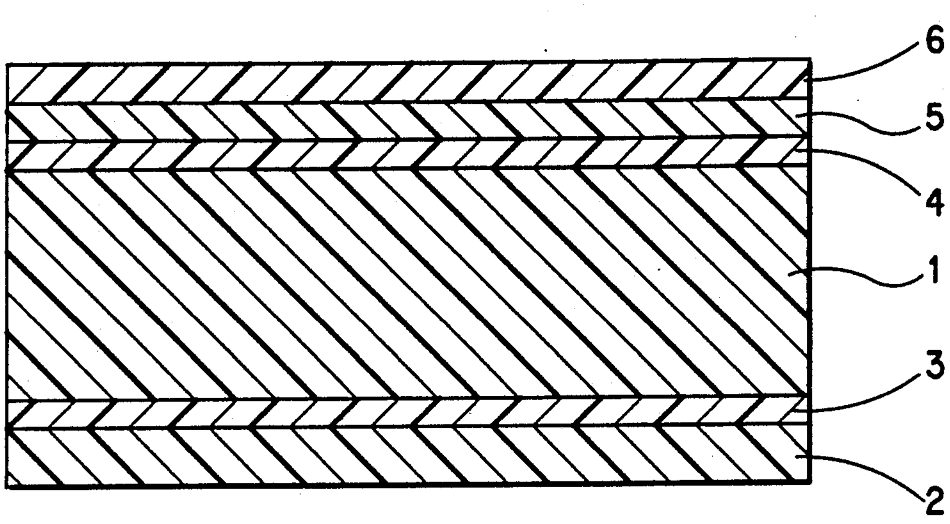
FIG. 1 is a cross-section of a film element useful for nonimpact printing having a single receptive layer.
Figure 2:
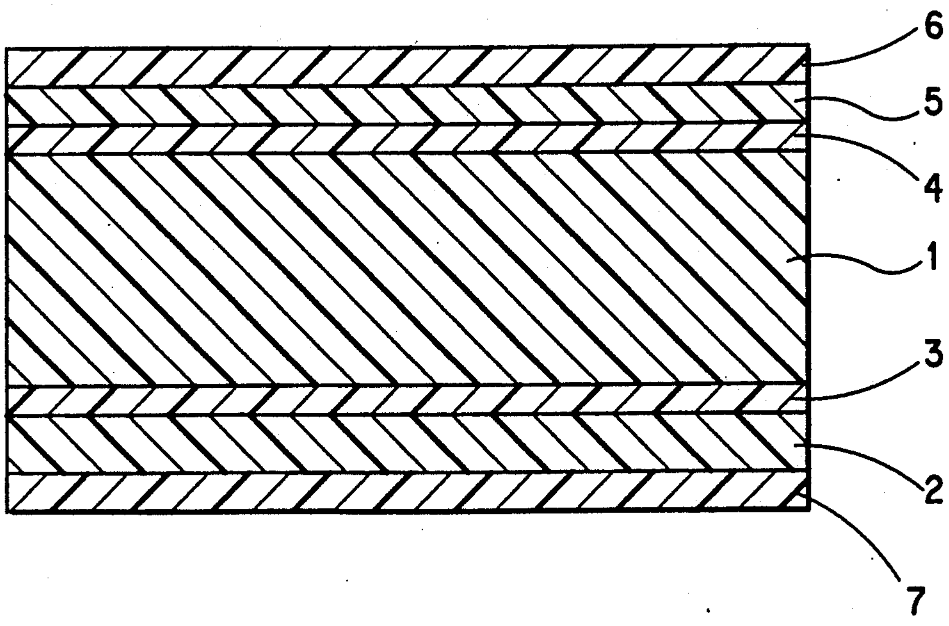
FIG. 2 is a cross section of another film element having coated on each side of the support a receptive layer.

Referring now specifically to the drawings wherein like numbers in the drawings refer to the same layers, FIG. 1 shows an element useful for nonimpact printing within this invention in which 1 is a support, e.g., dimensionally stable polyethylene terephthalate, 2 is an antistatic layer described more fully below and which is applied over a conventional resin sublayer 3. Layer 4 is another conventional resin sub layer over which has been applied a thin, substratum of hardened gelatin 5 and, applied supra thereon is the receptive layer 6 of this invention. In FIG. 2, illustrating another embodiment of the film element, receptive layer 7 is present over antistatic layer 2.

There are a host of polymeric elements which can be used as the support 1 for the element of this invention. These include transparent polyesters, polystyrenes, and polyvinylchloride, among others. We prefer polyesters. Conventional, dimensionally stable polyethylene terephthalate film support can be preferentially used as the polyester support within the ambit of the invention. These films are described in detail in Alles, U.S. Pat. No. 2,779,684 and the references incorporated therein. Polyesters are usually made by the polyesterification product of a dicarboxylic acid and a dihydric alcohol, as described in the aforementioned Alles patent. Since polyesters are very stable, they are the preferred films of this invention. However, it is extremely difficult to coat an aqueous dispersion on the surface of a dimensionally stable polyester support. It is, therefore, necessary to apply a subbing layer contiguous to the support to aide in the coating of subsequent layers. In this invention, we prefer the application of the resin subbing layers such as the modified mixed-polymer subbing compositions of vinylidene chloride-itaconic acid as taught by Rawlins, U.S. Pat. No. 3,567,452, the disclosure of which is incorporated herein by reference. This layer may be applied prior to the biaxial stretching step in which dimensional stability is implied within the film structure; in fact, it is so preferred.

The antistatic layer 2 which is applied to one side of the support for the receptive layer of this invention is vital to the use of this element within instruments used to impart nonimpact printing. We prefer using the antistatic coating of Schadt U.S. Pat. No. 4,225,665 or Miller, U.S. Pat. No. 4,859,570, the disclosures of which are incorporated herein by reference. The coating weight of the antistatic coating is 15 $mg/dm^2$ or less, preferably in the range of 7 to 10 $mg/dm^2$. A preferred element within the metes and bounds of this invention comprises a polyester support on which is coated at least one permanent antistatic layer consisting essentially of the reaction product of (1) a water-soluble, electrically conductive polymer having functionally attached carboxyl groups integral to the polymer,
(2) optionally a hydrophobic polymer containing carboxyl groups, and
(3) a polyfunctional substituted aziridine, wherein the hydrogen atom on a carbon atom of the aziridine ring is substituted with an alkyl substituent, wherein alkyl is of 1 to 6 carbon atoms, or an aryl substituent of 6 to 10 carbon atoms, the antistatic layer having a coating weight, based on the weight of conductive polymer (1), of 7 to 10 $mg/dm^2$.

This antistatic layer 2, which may be applied to the polyester film support during the manufacture thereof, is usually applied over a conventional resin sub layer. A heat treatment step is applied after these coatings to relieve the strain and tension in the support, comparable to the annealing of glass. All of these steps are conventional and are well known and taught as described in Alles and Miller, above. The various components, substituents and process steps are also well-known and taught in the Miller reference. Alternative antistatic layers or elements well-known in the prior art can, however, be used within this invention. These include those described in Schadt, U.S. Pat. No. 4,225,665, set out above, which describes an antistatic layer consisting essentially of a conductive polymer having carboxyl groups, a hydrophobic polymer having carboxyl groups, and a polyfunctional aziridine crosslinking agent; and, Miller, U.S. Pat. No. 4,301,239 which describes an energy treated film having an aqueous dispersion of a carbon-filled polyacrylate in admixture with a polyfunctional aziridine, the disclosures of which are incorporated herein by reference. It is also conventional to add particulate material and roughening agents to the antistatic layer, as is well known. In fact, it is preferred to add polymeric beads, e.g., polymethylmethacrylate, butylmethacrylate modified polymethacrylate beads, etc., and submicron particulate matter, e.g., polyethylene beads, etc., to this layer in order to improve its transport properties.

The formulation of the aqueous dispersion useful in coating the nonimpact print receptive layers 6 and 7 of this invention consists essentially of a binder, a whitening agent, a matte agent and a crosslinking agent for said binder. These ingredients are all important in providing a receptive layer which will function adequately within this invention.

Binders which are used to coat these layers are those which are dispersible in water and include gelatin and polyvinyl alcohol among others. We prefer using gelatin. Various wetting and dispersing agents may also be present to aid in the manufacture of this layer.

Whitening agents are also legion in number and include inorganic salts and pigments such as $TiO_2$, for example. We prefer adding $TiO_2$ in an amount sufficient to produce in the film element a transmission density to white light of at least 0.2, and preferably 0.3 or higher. Amounts of whitener present in the film element when a single receptive layer is present can be from 0.2 to 2.0 $g/m^2$, and preferably from 0.3 to 0.5 $g/m^2$, and most preferably 0.4 $g/m^2$. Amounts of whitener present in the film element when two receptive layers are present can be from 0.1 to 1.0 $g/m^2$, and preferably from 0.25 to 0.35 $g/m^2$, and most preferably 0.3 $g/m^2$ for each of said layers. A slurry of the whitener may be added by batchwise addition or by in-line injection just prior to coating the receptor layer(s) on the support.

Matte agents are also required within the receptive layers 6 and 7 of this invention. These are conventional matte agents such as silica, rice starch, and polymethylmethacrylate beads, for example. The matte agents should be in the average particle size range of 2–10 $\mu m$ and are usually added to the receptive layer in a range of 0.4 to 1.2 $g/m^2$ and preferably in a range of 0.70 to 0.90 $g/m^2$ with 0.80 $g/m^2$ being most preferred.

A crosslinking agent is required within the receptive layers 6 and 7 in order to provide the requisite hardening thereof. All of the conventional and well-known crosslinking and hardening agents used in the prior art with the binders described herein, will function. When gelatin is used, we prefer to use formaldehyde and chrome alum in combination to obtain a good, hard surface thereon. The hardeners should be present in a range of 3 to 20 mg/g of the binder (e.g. gelatin) and most preferably be present in a range of 4 to 18 mg/g of the binder.

In preferred elements representing this invention, we prefer using 0.003 to 0.010 inch (0.076 to 0.254 mm) dimensionally stable polyethylene terephthalate film on which a thin substratum of resin sub has been applied on both sides thereof. On one of these sides an antistatic layer made according to the teachings of Schadt U.S. Pat. No. 4,225,665 or Miller, U.S. Pat. No. 4,859,570, is applied in a coating weight of 7 to 10 $mg/dm^2$. On at least one side of the support, the receptive layer for nonimpact printing is applied over a conventional, hardened substratum of gelatin or the antistatic layer. The total dry coating weight of the print receptive layer is in the range of 4.0 to 5.9 $g/m^2$.

EXAMPLES

The following examples, wherein the percentages are by weight, illustrate but do not limit the invention. The receptive layer is preferably prepared from the following ingredients following the procedure described:

1. Prepare an aqueous dispersion of photographic grade gelatin in water (ca. 7% gelatin). Heat with stirring for 30 minutes at 130° F. (55° C.).
2. Add a matte agent (prefer 4 $\mu SiO_2$) as a slurry of 17 g of $SiO_2$ in 100 g of $H_2O$.
3. Add surfactant (prefer Polystep® B-27, supplied by Stepan Chemical Co.), 0.06 g/g gelatin.
4. Add 16 g of formaldehyde and 5 mg of chrome alum crosslinking agent per g gelatin.
5. Add $TiO_2$ as a whitening agent (0.14 g/g of gelatin).

Coat on a polyethylene terephthalate film described above and dry this composition at a total coating weight of 4.0 to 5.9 $g/m^2$.

EXAMPLE 1

Three (3) samples of receptive layer were made according to the procedure described above. Different mattes ($SiO_2$, rice starch, PMMA which is polymethylmethacrylate beads) and $TiO_2$ whitener at 1.9 $g/m^2$ were used. For control purposes, another sample was prepared but with no whitening agent. The transmission density of each sample was measured using a MacBeth TR927 instrument (MacBeth Co.). The white light measurements were as follows:

| Sample | Matte | Transmission Density |
|---|---|---|
| A | $SiO_2$ | 0.41 |
| B | Rice Starch | 0.42 |
| C | PMMA | 0.37 |
| D - Control | | 0.16 |

Each sample was tested for effectiveness using an Apple Laserwriter (Apple Computer Co., CA) instrument. In the case of Samples A - C, each produced a very satisfactory result in terms of image density and clarity. In the case of Sample D, the Control, this image was unsatisfactory.

EXAMPLE 2

In this example, a film support (0.004 inch (0.10 mm) dimensionally stable, polyethylene terephthalate film) was coated on both sides with a conventional resin sub. On one side, the antistatic layer of Miller, U.S. Pat. No. 4,859,570 was applied. On the other side, a thin, hardened substratum of gelatin was applied. The receptive layer was prepared from the following:

1. Solution of 7% photographic gelatin: 40000 g
2. Matte agent (17 g of $SiO_2$ in 100 g water): 3000 g
3. Surfactant (Polystep ® B-27): 1200 g
4. Formaldehyde (4% Aqueous Solution: 1200 g
5. Chrome Alum (3.3% Aqueous Solution: 400 g
6. Whitener (13 g $TiO_2$ slurry in 100 g water): 13000 g This mixture was thoroughly stirred and coated on the support supra to the gelatin sub coat and dried to a total coating weight of 5.0 g/m$^2$. The white light transmission density of this element was 0.40.

Samples of this coating were then analyzed by processing through an ink jet plotter and a pen plotter and by making copies of large drawings (e.g., blue-prints) using Xerox 3080 electrostatic copier (Xerox Corp., Stamford, CT). These samples produced excellent results in these instruments. The samples moved quickly within the system of each instrument and not a single jam was noted. Quality of the images was high and sharp and none of the images smeared. In addition, the film element of this invention could be written on by pencil or pen and could even receive an image from a typewriter.

EXAMPLE 3

Example 2 was repeated with the following exceptions: the antistatic layer of the following formulation:

conductive polymer (1): 100 parts of a copolymer of the sodium salt of styrene sulfonic acid with maleic anhydride in a 3:1 mole ratio, 5% aqueous solution, hydrophobic polymer (2): 20 parts of copolymer of styrene (43%)/butylmethacrylate (45)/butylacrylate (4%)/methacrylic acid (8%), polyfunctional substituted aziridine (3): 12 parts of pentaerythritol-tri-[$\beta$-(-N-2-methylaziridinyl)-propionate]

has a dry coating weight in the range of 7 to 10 mg/dm$^2$ based on the weight of conductive polymer (1), the antistatic layer side of the element was coated with half the amount of the composition used to coat the receptive layer and the other half of the receptive layer composition was coated on the side opposite the antistatic layer over the hardened substratum of gelatin. The coating weight of each of the receptive layers was 5.3 gm/m$^2$. Similar results were obtained as described in Example 2 when the film element was processed through an ink jet plotter, a pen plotter and electrostatic copiers set out below in Table 1.

TABLE 1

| Xerox Corp. Models[1] | | Shacoh Models[1] |
|---|---|---|
| 2510 | 5080 | 920RC |
| 3080 | 8836 | DP-36 |
| Ideal Models[1] | | Oce Model[1] |
| SZ920 | | DP-36 |
| DP-36 | | |

[1]Images formed on the receptive layer of the element opposite that of the antistatic layer.

We claim:

1. A film element suitable for nonimpact printing comprising a polymeric shaped article having two sides, an antistatic coating on one side thereof, and at least the other side of said article bearing a print receptive layer consisting essentially of a binder, a whitening agent, a matte agent present in an amount of at least 0.4 g/m$^2$ and a crosslinking agent for said binder, wherein said whitening agent is added in an amount sufficient to produce in the film element a transmission density to white light of at least 0.2.

2. An element according to claim 1 wherein said antistatic layer is an antistatic agent having carboxyl groups thereon, a crosslinking agent for the antistatic agent, butylmethacrylate modified polymethacrylate beads and submicron polyethylene beads.

3. An element according to claim 1 wherein the antistatic layer consists essentially of the reaction product of (1) a water-soluble, electrically conductive polymer having functionally attached carboxyl groups integral to the polymer, and (2) a polyfunctional substituted aziridine, wherein the hydrogen atom on a carbon atom of the aziridine ring is substituted with an alkyl substituent, where alkyl is of 1 to 6 carbon atoms, or an aryl substituent of 6 to 10 carbon atoms, the antistatic layer having a coating weight, based on the weight of conductive polymer (1), of 15 mg/dm$^2$ or less.

4. An element according to claim 1 wherein the antistatic layer having a coating weight, based on the weight of conductive polymer, of 15 mg/dm$^2$ or less consists essentially of a conductive polymer having carboxyl groups, a hydrophobic polymer having carboxyl groups, and a polyfunctional aziridine crosslinking agent.

5. An element according to claim 1 wherein said film element transmission density is at least 0.3.

6. An element according to claim 1 wherein said matte agent is present in an amount of from 0.4 to 1.2 g/m$^2$.

7. An element according to claim 1 wherein the polymeric-shaped article is a film.

8. An element according to claim 7 wherein the film is dimensionally stable polyethylene terephthalate.

9. An element according to claim 1 wherein the binder is selected from the group consisting of gelatin and polyvinyl alcohol.

10. An element according to claim 9 wherein the binder is gelatin.

11. An element according to claim 1 wherein the whitening agent is $TiO_2$.

12. An element according to claim 1 wherein the matte agent is selected from the group consisting of silica, rice starch and polymethylmethacrylate beads, 2 to 10 μm average particle size.

13. An element according to claim 9 wherein the crosslinking agent for the binder is a combination of formaldehyde and chrome alum.

14. A film element suitable for nonimpact printing comprising a dimensionally stable, polyester film support resin subbed on each side, 0.003 to 0.010 inch in thickness, on which is coated on one resin subbed side of the film at least one permanent antistatic layer consisting essentially of the reaction product of (1) a water-soluble, electrically conductive polymer having functionally attached carboxyl groups integral to the polymer, and (2) a polyfunctional substituted aziridine, wherein the hydrogen atom on a carbon atom of the aziridine ring is substituted with an alkyl substituent, where alkyl is of 1 to 6 carbon atoms, or an aryl substituent of 6 to 10 carbon atoms, the antistatic layer having a coating weight, based on the weight of conductive polymer (1), of 7 to 10 $mg/dm^2$.

and coated on the other resin subbed side of the film in order a thin substratum of hardened gelatin and a print receptive layer consisting essentially of (1) a gelatin binder, (2) a $TiO_2$ whitening agent in an amount of 0.2 to 2.0 $g/m^2$, to provide a transmission density to white light of 0.2 to 0.42, (3) a matte agent selected from the group consisting of silica, rice starch and polymethylmethacrylate beads in an amount of 0.4 to 1.2 $g/m^2$, and (4) a formaldehyde and chrome alum crosslinking agent for the gelatin binder in an amount of 3 to 20 mg/g of the weight of the gelatin binder, the total dry coating weight of the print receptive layer being 4.0 to 5.9 $g/m^2$.

15. A film element according to claim 1 wherein a print receptive layer is also present over the antistatic coating layer.

16. A film element suitable for nonimpact printing comprising a dimensionally stable, polyester film support resin subbed on each side, 0.003 to 0.010 inch in thickness, on which is coated in order on one resin subbed side of the film at least one permanent antistatic layer consisting essentially of the reaction product of (1) a water-soluble, electrically conductive polymer having functionally attached carboxyl groups integral to the polymer, and (2) a polyfunctional substituted aziridine, wherein the hydrogen atom on a carbon atom of the aziridine ring is substituted with an alkyl substituent, where alkyl is of 1 to 6 carbon atoms, or an aryl substituent of 6 to 10 carbon atoms, the antistatic layer having a coating weight, based on the weight of conductive polymer (1), of 7 to 10 $mg/dm^2$, and a print receptive layer consisting essentially of (1) a gelatin binder, (2) a $TiO_2$ whitening agent in an amount of 0.2 to 2.0 $g/m^2$, (3) a matte agent selected from the group consisting of silica, rice starch and polymethylmethacrylate beads in an amount of 0.4 to 1.2 $g/m^2$, and (4) a formaldehyde and chrome alum crosslinking agent for the gelatin binder in an amount of 3 to 20 mg/g of the weight of the gelatin binder, and coated on the other resin subbed side of the film in order a thin substratum of hardened gelatin and a print receptive layer consisting essentially of (1) a gelatin binder, (2) a $TiO_2$ whitening agent in an amount of 0.2 to 2.0 $g/m^2$, (3) a matte agent selected from the group consisting of silica, rice starch and polymethylmethacrylate beads in an amount of 0.4 to 1.2 $g/m^2$, and (4) a formaldehyde and chrome alum crosslinking agent for the gelatin binder in an amount of 3 to 20 mg/g of the weight of the gelatin binder, the dry coating weight of each print receptive layer being 4.0 to 5.9 $g/m^2$, and the total transmission density to white light of the film element ranges from 0.2 to 0.42.

17. A film element suitable for nonimpact printing comprising a dimensionally stable, polyester film support resin subbed on each side, 0.003 to 0.010 inch in thickness, on which is coated on one resin subbed side of the film at least one permanent antistatic layer consisting essentially of the reaction product of (1) a water-soluble, electrically conductive polymer having functionally attached carboxyl groups integral to the polymer, (2) hydrophobic polymer containing carboxyl groups, and (3) a polyfunctional substituted aziridine, wherein the hydrogen atom on a carbon atom of the aziridine ring is substituted with an alkyl substituent, where alkyl is of 1 to 6 carbon atoms, or an aryl substituent of 6 to 10 carbon atoms, the antistatic layer having a coating weight, based on the weight of conductive polymer (1), of 7 to 10 $mg/dm^2$.

and coated on the other resin subbed side of the film in order a thin substratum of hardened gelatin and a print receptive layer consisting essentially of (1) a gelatin binder, (2) a $TiO_2$ whitening agent in an amount of 0.2 to 2.0 $g/m^2$, to provide a transmission density to white light of 0.2 to 0.42, (3) a matte agent selected from the group consisting of silica, rice starch and polymethylmethacrylate beads in an amount of 0.4 to 1.2 $g/m^2$, and (4) a formaldehyde and chrome alum crosslinking agent for the gelatin binder in an amount of 3 to 20 mg/g of the weight of the gelatin binder, the total dry coating weight of the print receptive layer being 4.0 to 5.9 $g/m^2$.

18. A film element suitable for nonimpact printing comprising a dimensionally stable, polyester film support resin subbed on each side, 0.003 to 0.010 inch in thickness, on which is coated in order on one resin subbed side of the film at least one permanent antistatic layer consisting essentially of the reaction product of (1) a water-soluble, electrically conductive polymer having functionally attached carboxyl groups integral to the polymer, (2) hydrophobic polymer containing carboxyl groups, and (3) a polyfunctional substituted aziridine, wherein the hydrogen atom on a carbon atom of the aziridine ring is substituted with an alkyl substituent, where alkyl is of 1 to 6 carbon atoms, or an aryl substituent of 6 to 10 carbon atoms, the antistatic layer having a coating weight, based on the weight of conductive polymer (1), of 7 to 10 $mg/dm^2$, and a print receptive layer consisting essentially of (1) a gelatin binder,
(2) a $TiO_2$ whitening agent in an amount of 0.2 to 2.0 $g/m^2$,
(3) a matte agent selected from the group consisting of silica, rice starch and polymethylmethacrylate beads in an amount of 0.4 to 1.2 $g/m^2$, and
(4) a formaldehyde and chrome alum crosslinking agent for the gelatin binder in an amount of 3 to 20 mg/g of the weight of the gelatin binder, and coated on the other resin subbed side of the film in order a thin substratum of hardened gelatin and a print receptive layer consisting essentially of (1) a gelatin binder,
(2) a $TiO_2$ whitening agent in an amount of 0.2 to 2.0 $g/m^2$,
(3) a matte agent selected from the group consisting of silica, rice starch and polymethylmethacrylate beads in an amount of 0.4 to 1.2 $g/m^2$, and
(4) a formaldehyde and chrome alum crosslinking agent for the gelatin binder in an amount of 3 to 20 mg/g of the weight of the gelatin binder, the dry coating weight of each print receptive layer being 4.0 to 5.9 $g/m^2$, and the total transmission density to white light of the film element ranges from 0.2 to 0.42.

* * * * *